(12) United States Patent
Bono et al.

(10) Patent No.: US 11,435,948 B2
(45) Date of Patent: Sep. 6, 2022

(54) METHODS AND SYSTEMS FOR USER SPACE STORAGE MANAGEMENT

(71) Applicant: EMC IP Holding Company LLC, Hopkinton, MA (US)

(72) Inventors: Jean-Pierre Bono, Westboro, MA (US); Doron Tal, Geva Carmel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/778,833

(22) Filed: Jan. 31, 2020

(65) Prior Publication Data

US 2021/0240387 A1 Aug. 5, 2021

(51) Int. Cl.
*G06F 3/06* (2006.01)

(52) U.S. Cl.
CPC .......... *G06F 3/0659* (2013.01); *G06F 3/0604* (2013.01); *G06F 3/065* (2013.01); *G06F 3/067* (2013.01); *G06F 3/0653* (2013.01)

(58) Field of Classification Search
None
See application file for complete search history.

(56) References Cited

U.S. PATENT DOCUMENTS

| 9,684,593 | B1* | 6/2017 | Chen | G06F 12/0811 |
| 2012/0150858 | A1* | 6/2012 | Ripberger | G06F 3/0629 |
| | | | | 707/737 |
| 2016/0371145 | A1* | 12/2016 | Akutsu | H03M 13/2906 |
| 2017/0344283 | A1* | 11/2017 | Guim Bernat | G06F 3/0619 |

OTHER PUBLICATIONS

Dell EMC Flex Family and VXFlex OS: The Software Behind the Systems, Architecture Matters, White Paper, Jun. 2018 (Year: 2018).*
Evans, Chris, EMC, ScaleIO and The VMkernel, architectingit, Jan. 16, 2015, https://www.architecting.it/blog/emc-scaleio-and-the-vmkernel/ (Year: 2015).*
"Dell EMC VxFlex OS: Networking Best Practices and Design Considerations"; Dell Inc.; May 2019.
Donna Brasure; "Dell EMC VxFlex Family Overview"; Dell Inc.; H17693 May 2019.

* cited by examiner

*Primary Examiner* — Arpan P. Savla
*Assistant Examiner* — Edmund H Kwong
(74) *Attorney, Agent, or Firm* — Chamberlain, Hrdlicka, White, Williams & Aughtry (57) ABSTRACT

A method for accessing data where the method includes receiving, by an access client executing in user space, a request to read data that includes a file system identifier and an offset, identifying a storage server associated with the data, generating a command to copy the data to memory, and sending the command to the storage server.

14 Claims, 6 Drawing Sheets

METHODS AND SYSTEMS FOR USER SPACE STORAGE MANAGEMENT

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, the invention relates to a method for accessing data that includes receiving, by an access client executing in user space, a request to read data, identifying a storage server associated with the data, generating a command to copy the data to memory, and sending the command to the storage server.

In general, in one aspect, the invention relates to a non-transitory computer readable medium comprising instructions which, when executed by a computer processor, enables the computer processor to perform a method for accessing data that includes receiving, by an access client executing in user space, a request to read data, identifying a storage server associated with the data, generating a command to copy the data to memory, and sending the command to the storage server.

In general, in one aspect, the invention relates to a node that includes memory; and a processor, wherein the processor is configured to perform a method that includes receiving, by an access client executing in user space, a request to read data, identifying a storage server associated with the data, generating a command to copy the data to memory, and sending the command to the storage server.

Other aspects of the invention will be apparent from the following description and the appended claims.

DETAILED DESCRIPTION

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

Prior to the invention disclosed in this application, every file system, snapshot, and other storage volume accessible by a system required a unique virtual "block device" to be created and maintained in the operating system. However, the limited resources available to the operating system ultimately limited the total number of "block devices" that may be managed. Accordingly, these legacy systems were unable to be utilized efficiently in environments that required large numbers of block devices.

In general, embodiments of the invention disclosed herein relate to systems, devices, and methods for utilizing user space software to access (e.g., read, write, create, etc.) data on storage devices without interacting with operating system software (e.g., kernel software). Specifically, in one embodiment of the invention, software executes in user space that allows for the abstraction of logical storage volumes into objects, which are then made accessible to other software executing in user space (e.g., application(s)). Thus, by leveraging logical storage abstractions in user space, existing operating system software that performs duplicative functions may be bypassed.

The performance of storage volume management in user space may result in one or more advantages. In one embodiment of the invention, a performance increase is achieved as the interaction between user space software and operating system software is reduced (i.e., less input/output (I/O) calls are exchanged). Thus, accessing the underlying storage hardware may be achieved with less latency as fewer operations are required and/or more resources are accessible when utilizing the user space software.

In one embodiment of the invention, as user space software has access to more and/or faster resources, the ability to add additional storage volumes is not constrained by the (comparatively) limited resources allocated to the operating system. Accordingly, rapid expansion and growth of a system (or network of systems) becomes possible as every new storage volume is managed via an object (instead of a conventional "block device" executing in the kernel).

In one embodiment of the invention, by limiting and/or avoiding the use of operating system software, the overall system is made less complex and easier to maintain. For example, in one embodiment of the invention, operating system software may be maintained by a third party that may update the operating system break integration with user space software. Further, operating system software may be subjected to updates (including those that potentially break integration) more frequently than user space software, thereby requiring corresponding updates to the user space software to maintain integration. Accordingly, by limiting use of operating system software, and/or avoiding the use of certain operating system software altogether, a simpler and easier to maintain system is implemented. The invention is not limited by the aforementioned advantages.

Figure 1:
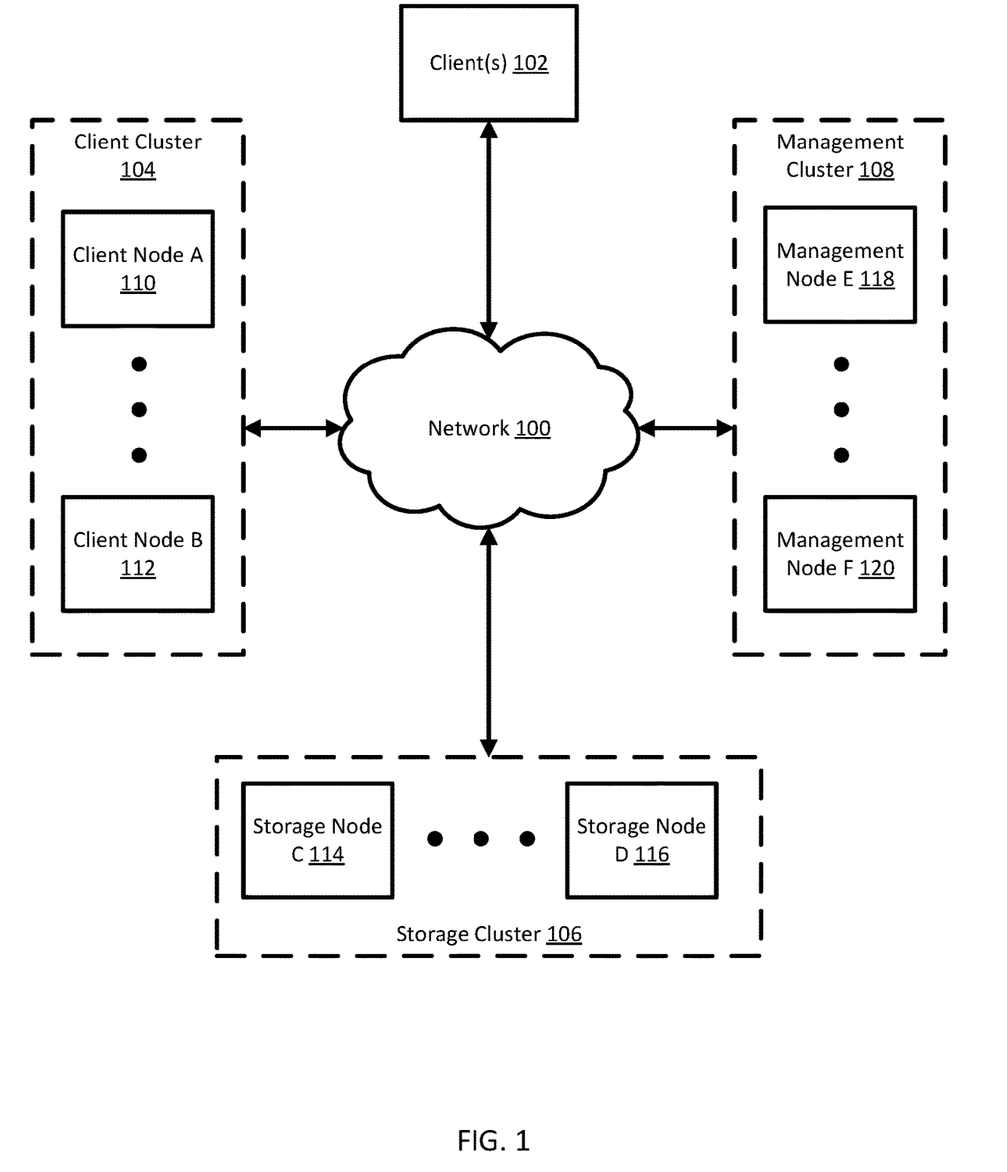
FIG. 1 shows a diagram of a system, in accordance with one or more embodiments of the invention.

FIG. 1 shows a diagram of a system, in accordance with one or more embodiments of the invention. The system may include a network (100), which is operatively connected to client(s) (102), a client cluster (104), a storage cluster (106), and a management cluster (108). Each of these components is described below.

In one or more embodiments of the invention, a network (e.g., network (100)) is a collection of connected network devices (not shown) that allow for the communication of data from one network device (not shown) to other network devices (not shown), or the sharing of resources among network devices (not shown). Examples of a network (e.g., network (100)) include, but are not limited to, a local area network (LAN), a wide area network (WAN) (e.g., the Internet), a mobile network, or any other type of network that allows for the communication of data and sharing of resources among network devices and/or devices operatively connected to the network (100).

In one or more embodiments of the invention, a client (e.g., client(s) (102)) is implemented as computing devices. Each computing device may include one or more processors, memory (e.g., random access memory), and persistent storage (e.g., disk drives, solid state drives, etc.). The persistent storage may store computer instructions, (e.g., computer code) which, when executed by the processor(s) of the computing device, cause the computing device to issue one or more requests and to receive one or more responses. Examples of a computing device include a mobile phone, tablet computer, laptop computer, desktop computer, server, distributed computing system, or cloud resource. In one or more embodiments of the invention, a client (e.g., client(s) (102)) may be implemented as a logical device. The logical device may utilize the computing resources of any number of computing devices (defined above).

In one or more embodiments of the invention, client(s) (102) may request data and/or send data to one or more clusters (104, 106, 108). Further, in one or more embodiments, client(s) (102) may initiate an application (not shown) to execute on one or more clusters (104, 106, 108) such the application may, itself, gather, transmit, and/or otherwise manipulate data on the clusters (104, 106, 108), remote to the client(s) (102). In one or more embodiments of the invention, one or more client(s) (102) may share access to the same cluster (104, 106, 108) and may similarly share any data located on those clusters (104, 106, 108).

In one or more embodiments of the invention, a cluster (e.g., client cluster (104), storage cluster (106), management cluster (108)) is a collection of two or more operatively connected nodes (110, 112, 114, 116, 118, 120). In one or more embodiments of the invention, nodes of a cluster (104, 106, 108) may be operatively connected via a network (e.g., network (100)). Nodes (110, 112, etc.) of cluster (104, 106, 108) may be operatively connected via the same LAN, operatively connected via a WAN, or grouped within several LANs, each of which is operatively connected via a WAN. One of ordinary skill in the art, having the benefit of this detailed description, will appreciate that the nodes (110, 112, etc.) may be operatively connected via one or more forms of communication.

In one or more embodiments of the invention, nodes (110, 112, etc.) may be operatively connected via the communication interface(s) (not shown) located within each node. Nodes (110, 112, etc.) may utilize one or more protocols to enable the communication of one or more components within each node. For example, each node (110, 112, etc.) of cluster (104, 106, 108) may be operatively connected, via Ethernet, using a TCP/IP protocol to form a "network fabric" and enable the communication of data between nodes. In one or more embodiments of the invention, each node within a cluster may be given a unique identifier (e.g., an IP address) to be used when utilizing one or more protocols.

Alternatively, in one or more embodiments of the invention, nodes (110, 112, etc.) of cluster (104, 106, 108) interact with, initiate, alter, and/or control the software (e.g., user space applications, operating system software) executing on other nodes. Thus, in one or more embodiments of the invention, the communication between nodes (110, 112, etc.) of cluster (104, 106, 108) is not limited to the sharing of stored data in the hardware layer (not shown) of each node (110, 112, etc.). Rather, nodes (110, 112, etc.) may communicate instructions related to the execution of software including, for example, requesting another node (110, 112, etc.) to provide information or initiate a process on that other node (110, 112, etc.). Accordingly, in one embodiment of the invention, a node (110, 112, etc.) may outsource the processing of one or more software tasks to another node (110, 112, etc.).

In one embodiment of the invention, a client cluster (e.g., client cluster (104)) is a cluster that includes one or more client nodes (110, 112). In one embodiment of the invention, a client node (e.g., client node A (110), client node B (112)) is a node that is executing, at least, an access client (not shown) in the user space (not shown) of that node, as explained in the description of FIG. 2.

In one embodiment of the invention, a storage cluster (e.g., storage cluster (106)) is a cluster that includes one or more storage nodes (114, 116). In one embodiment of the invention, a storage node (e.g., storage node C (114), storage node D (116)) is a node that is executing, at least, a storage server (not shown) in the operating system (not shown) of that node, as explained in the description of FIG. 2.

In one embodiment of the invention, a management cluster (e.g., management cluster (108)) is a cluster that includes one or more management nodes (118, 120). In one embodiment of the invention, a management node (e.g., management node E (118), management node F (120)) is a node that is executing, at least, a management server (not shown) in the operating system (not shown) of that node, as explained in the description of FIG. 2.

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
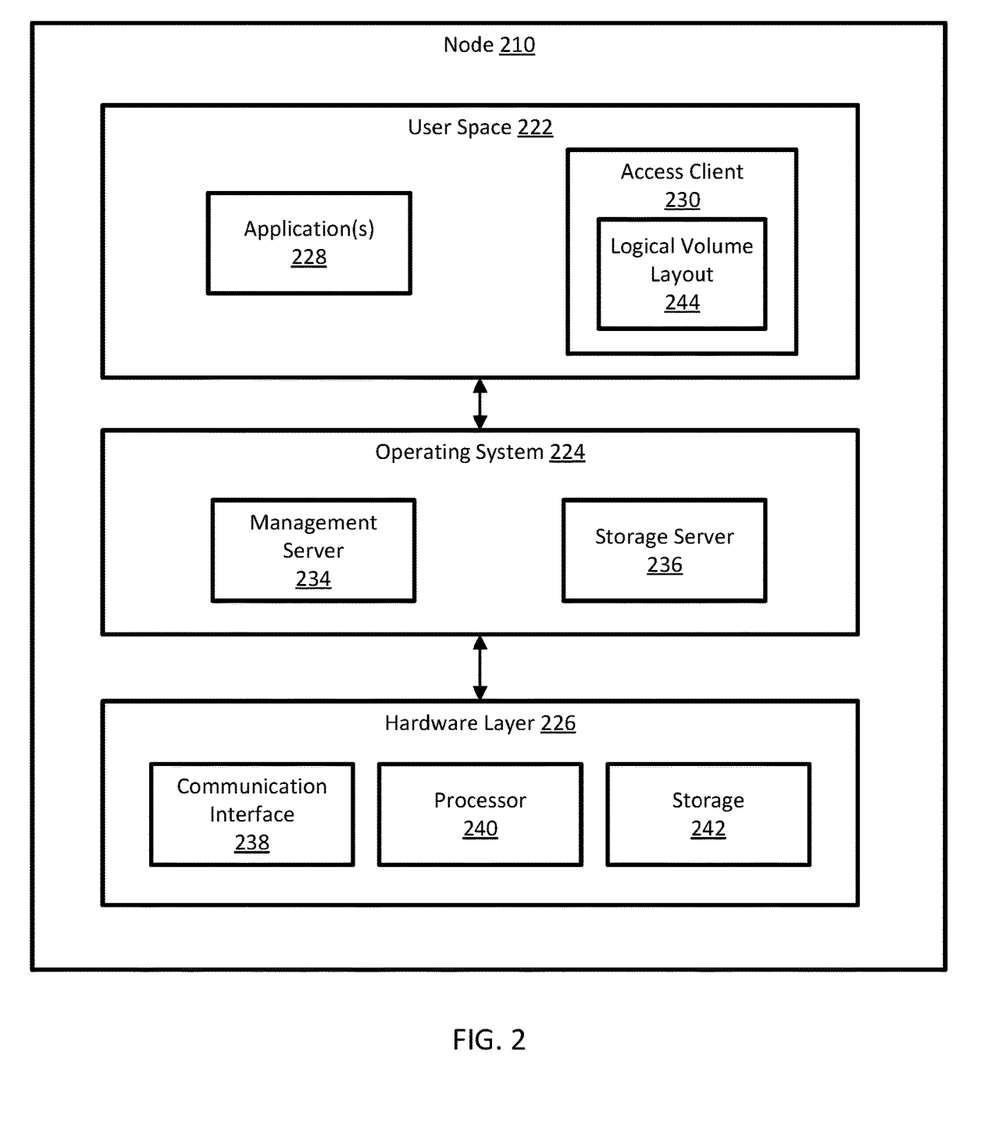
FIG. 2 shows a diagram of a node, in accordance with one or more embodiments of the invention.

FIG. 2 shows a diagram of a node (e.g., node (210)), in accordance with one or more embodiments of the invention. In one embodiment of the invention, a node (e.g., node (210)) includes a user space (e.g., user space (222)), an operating system (e.g., operating system (224)), and a hardware layer (e.g., hardware layer (226)). Each of these components is described below.

In one or more embodiments of the invention, user space (e.g., user space (222)) is a software environment on the node (210) that generally provides a virtual space in which user initiated software executes (e.g., programs, application(s) (228), etc.). In one or more embodiments of the invention, user space (222) is provided a segregated memory environment (from operating system memory) and may be able to leverage more of the underlying resources of the node (210) to perform processes. In one embodiment of the invention, user space (222) does not have direct access to underlying hardware components (i.e., those of hardware layer (226)). Instead, user space software (228, 230) must provide commands and/or requests to the operating system (224), which coordinates the exchange of information between user space software (228, 230) and hardware layer (226) devices.

In one or more embodiments of the invention, an application (e.g., application(s) (228)) is software executing within the user space (222), that may include instructions which, when executed by a processor (240), initiate the performance of one or more operations of components of the hardware layer (226). Although application(s) (228) is shown executing directly in user space (222), one or more applications (e.g., 228) may execute inside of an application container (not shown). That is, one or more application(s) (e.g., 228) may execute in an isolated instance, within an application container that is executing directly within user space (222).

In one or more embodiments of the invention, an access client (e.g., access client (230)) is software executing in user space (222) that coordinates with one or more storage server(s) (e.g., storage server (236)) to generate and provide volume information to one or more application(s) (e.g., application(s) (228)). Further, in one embodiment of the invention, an access client (e.g., access client (230)) performs device discovery, generates snapshots, establishes one or more file systems, and generates objects representing one or more logical volumes of those devices, snapshots, and/or file systems.

In one or more embodiments of the invention, an access client (e.g., access client (230)) is configured to independently communicate with one or more storage server(s) (e.g., storage server (236)). That is, an access client may be configured to generate and send requests to a storage server of another node (not shown) via a communication interface (238) without first communicating with a centralized device (e.g., node, server, hub, etc.). Accordingly, in one embodiment of the invention, each access client (e.g., access client (230)) is configured to obtain data (e.g., logical volume layout (244)) that provides the necessary information to identify which storage server (e.g., 236) is managing any particular data.

Figure 3:
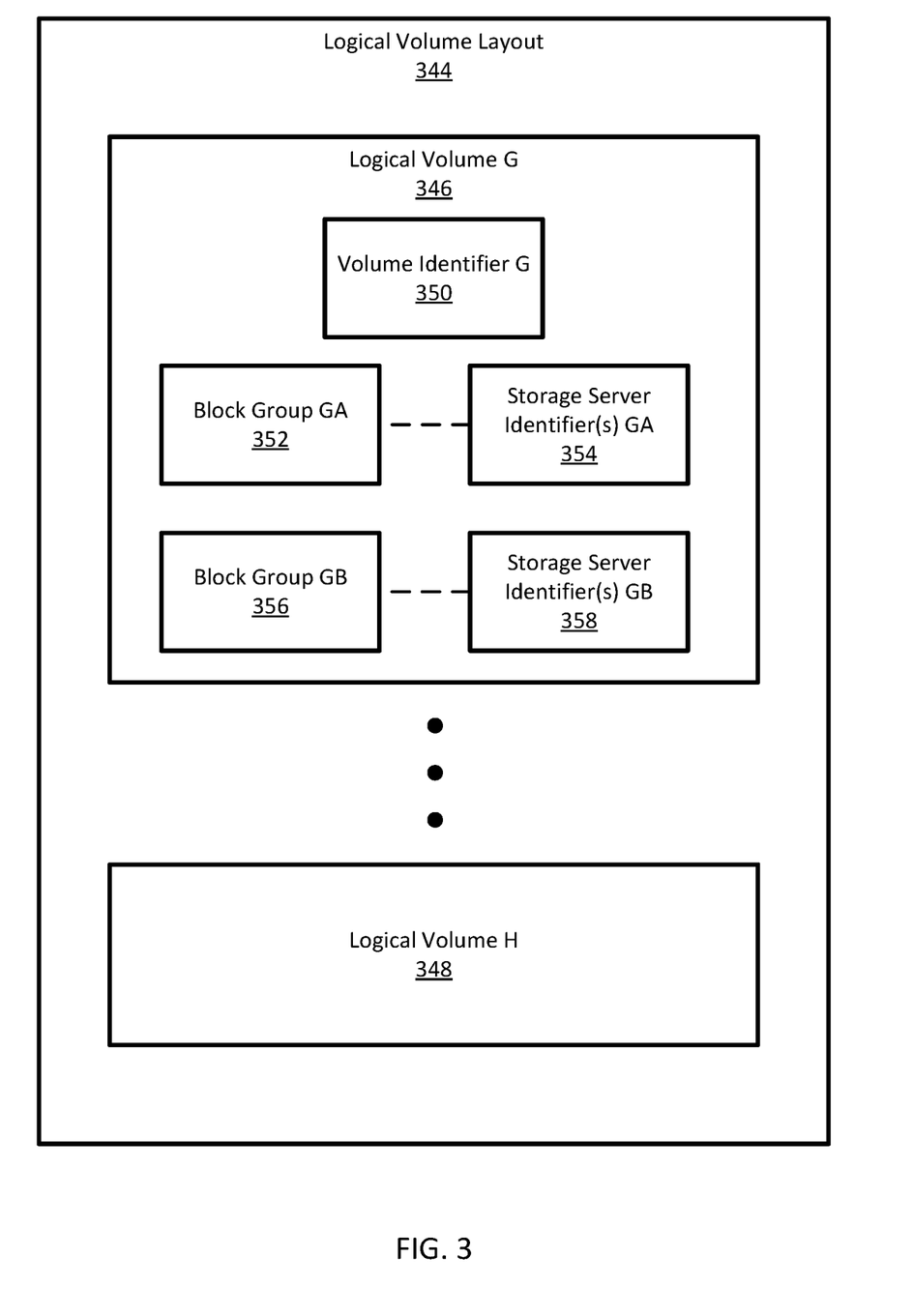
FIG. 3 shows a diagram of a logical volume layout, in accordance with one or more embodiments of the invention.

In one or more embodiments of the invention, an access client (e.g., access client (230)) includes a logical volume layout (e.g., logical volume layout (244)), described in more detail in the discussion of FIG. 3.

In one or more embodiments of the invention, an operating system (e.g., operating system (224)) is software executing on the node (210). In one embodiment of the invention, an operating system (224) coordinates operations between software executing in user space (222) and one or more components of the hardware layer (226) to facilitate the proper use of those hardware layer (226) components. In one or more embodiments of the invention, the operating system (224) includes a management server (e.g., management server (234)) and/or a storage server (e.g., storage server (236)). In one embodiment of the invention, the operating system (224) may be executing software that monitors data traversing the operating system (224) (e.g., interactions between user space (222) software and hardware layer (226) components) and may intercept, modify, and/or otherwise alter that data based on one or more conditions.

In one or more embodiments of the invention, a management server (e.g., management server (234)) is software executing in the operating system (224) that monitors one or more storage server(s) (e.g., storage server (236)) to determine if a change has occurred in the logical volume layout (e.g., logical volume layout (244)) and, in response provides updates (e.g., a copy of the logical volume layout (244)) to one or more access client(s) (e.g., access client (230)).

In one or more embodiments of the invention, a storage server (e.g., storage server (236)) is software executing in the operating system (224) that manages the storage (242) of the node (210) on which the storage server (236) is executing. In one or more embodiments of the invention, the storage server (236) may be configured to provide access to all or a portion of the storage (242) available in the node (210). Further, the storage server (236) may be configured to communicate with the management server (e.g., management server (234)) to provides updates regarding any changes in the storage (242) that need to be reflected in an associated logical volume (of the logical volume layout (244)).

In one or more embodiments of the invention, a hardware layer (e.g., hardware layer (226)) is a collection of physical components configured to perform the operations of the node (210) and/or otherwise execute the software of the node (210) (e.g., application(s) (228), access client (230), management server (234), storage server (236)). The hardware layer (e.g., hardware layer (226)) may include a communication interface (e.g., communication interface (238)), a processor (e.g., processor (240)), and storage (e.g., storage (242)). Each of these components is described below.

In one or more embodiments of the invention, a communication interface (e.g., communication interface (238)) is a hardware component that provides capabilities to interface the node (210) with one or more devices (e.g., a client, another node, a network of devices) and allow for the transmission and receipt of data with those devices. A communication interface (238) may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.).

In one or more embodiments of the invention, a processor (e.g., processor (240)) is an integrated circuit for processing instructions (e.g., those of user space (222) software (application (228), access client (230)) and/or operating system (224) software (management server (234), storage server (236)) and/or those received via a communication interface (238)). In one embodiment of the invention, a processor (e.g., processor (240)) may be one or more processor cores or processor micro-cores.

In one or more embodiments of the invention, storage (e.g., storage (242)) is one or more hardware devices capable of storing digital information (e.g., data) in a non-transitory medium. Examples of storage (e.g., storage (242)) include, but are not limited to, integrated circuit storage devices (e.g., solid-state drive (SSD), Non-Volatile Memory Express (NVMe), flash memory, random access memory (RAM), dynamic RAM (DRAM), resistive RAM (ReRAM), etc.), magnetic storage (e.g., hard disk drive (HDD), floppy disk, tape, diskette, etc.), or optical media (e.g., compact disc (CD), digital versatile disc (DVD), etc.).

In one or more embodiments of the invention, storage may include one or more devices designated as "memory". In one embodiment of the invention, and as used herein, "memory" refers to storage that provides faster access than other forms of storage. Further, in one embodiment of the invention, software (228, 230, 234, 236) executing on the node (210) may use memory to temporarily store and manipulate data before persisting that data back into other storage devices. One of ordinary skill in the art, having the benefit of this detailed description, would appreciate that memory is a variant (or subset) of storage that provides a node the ability to access and manipulate data with less latency.

As used herein, a node may be considered a "client node" if that node is executing an access client (230), a node may be considered a "storage node" if that node is executing a storage server (236), and a node may be considered a "management node" if that node is executing a management server (234). Further, as shown in FIG. 2, one node may be executing two or more of these software instances concurrently. Thus, a single node may be considered more than one type of node ("client", "storage", "management") depending on the interaction with that node and the processes performed by that node at a particular time.

For example, two independent nodes may each execute all three software types (access client (230), storage server (236), and management server (234)) concurrently. However, in a scenario where one node is serving data from storage (operations performed by a storage server (236)) and the other node is accessing that data for an application (228) (operations performed by an access client (230)), the first node may be considered a "storage node" while the second node may be considered a "client node". That is, even though both nodes are capable of performing the functions of all three types of nodes, both nodes may, nonetheless, be considered only one particular type of node based on their relevant operations.

While FIG. 2 shows a specific configuration of a node, other configurations may be used without departing from the scope of the invention. For example, a given node may not include an access client, a management server, and a storage server; rather, a given node may only include a subset of the aforementioned components depending of the type of the node (i.e., whether the node is a client node, a storage node, a management node, or some combination thereof). Accordingly, embodiments disclosed herein should not be limited to the configuration of devices and/or components shown in FIG. 2.

FIG. 3 shows a diagram of a logical volume layout (e.g., logical volume layout (344)), in accordance with one or more embodiments of the invention. In one embodiment of the invention, a logical volume layout (e.g., logical volume layout (344)) is a data structure that includes a listing of one or more logical volumes (e.g., logical volume G (346), logical volume H (348)), described below In one or more embodiments of the invention, a logical volume (e.g., logical volume G (346), logical volume H (348)) is data structure that includes a volume identifier (e.g., volume identifier G (350)), one or more block groups (e.g., block group GA (352), block group GB (356)), and one or more associated storage server identifier(s) (e.g., storage server identifier(s) GA (354), storage server identifier(s) GB (358)).

In one or more embodiments of the invention, a logical volume (e.g., logical volume G (346), logical volume H (348)) includes information (e.g., metadata) about one or more physical storage devices (or portions thereof). Further, a logical volume (346, 348) may group one or more regions of physical storage into a single "volume", even though those regions of physical storage may be of different types (e.g., HDD and SSD) and/or disparately located (e.g., in two different nodes). Thus, a logical volume (346, 348) may provide a unified representation of multiple storage devices that does not reflect the underlying physical structure and location of those devices. In one or more embodiments of the invention, a logical volume (346, 348) may be generated as an object to be used by one or more user space applications.

In one or more embodiments of the invention, an object is variable data structure that may be accessed and/or referenced by software executing on the node (e.g., shared and readable to one or more software instances). In one embodiment of the invention, an object is maintained in memory to provide faster access to the data stored therein. An object may store data (e.g., metadata) relating to a logical volume, and itself may include a hierarchy of data subcomponents (e.g., including a volume identifier (e.g., 350), one or more block groups (e.g., 352, 356), and/or one or more storage server identifiers (e.g., 354, 358)). In one embodiment of the invention, a single object relates to only one logical volume (346, 348). Or, alternatively, in another embodiment of the invention, a single object may represent the entire logical volume layout (244), where each logical volume (346, 348) may be a sub-component (e.g., a smaller object) within that largest object.

In one or more embodiments of the invention, a volume identifier (e.g., volume identifier G (350)) is an alphanumeric expression associated with a logical volume (e.g., logical volume G (346)). The alphanumeric expression may be encoded using a standard protocol for alphanumeric characters (e.g., Unicode, American Standard Code for Information Interchange (ANSII), etc.). In one embodiment of the invention, the volume identifier (350) is provided by a user of one or more nodes (not shown) that initiated the creation of the corresponding logical volume (e.g., logical volume G (346)) and may further be a string of text that uniquely identifies that logical volume to one or more users (e.g., "vol_4", "engineering", "sales_east", etc.). Alternatively, in one embodiment of the invention, a volume identifier (350) may be automatically generated by one or more storage servers (not shown) when the logical volume is initially created. One of ordinary skill in the art, having the benefit of this detailed description, would appreciate that a volume identifier may be any alphanumeric expression that is unique to the associated logical volume.

In one or more embodiments of the invention, a block group (e.g., block group GA (352), block group GB (356)) is a range of "blocks" (i.e., fixed size units of data) in the logical volume (346, 348). In one embodiment of the invention, each block group (352, 356) within the same logical volume (e.g., logical volume (346)) provides non-overlapping ranges such that an offset (and/or address) of the logical volume (346, 348) maps uniquely to one block group (352, 356). Further, in one embodiment of the invention, a block group (352, 356) is associated with only one storage server (e.g., via a storage server identifier (354, 358)); however, a single storage server may be associated with one or more block group(s) (352, 356). In one or more embodiments of the invention, one or more block group(s) (352, 356) may be used to calculate the size of the logical volume (346) (by summing all block within that logical volume (346)) and/or the individual size of the portion of the logical volume layout (344) each storage server is responsible for managing.

In one or more embodiments of the invention, a storage server identifier (e.g., storage server identifier(s) GA (354), storage server identifier(s) GB (358)) is data uniquely associated with a storage server. In one or more embodiments of the invention, the storage server identifier is a unique address (e.g., an IP address of the hosting node) to enable the communication with the storage server. Further, in one embodiment of the invention, a storage server identifier (354, 358), like a volume identifier, may be an alphanumeric expression encoded using a standard protocol for alphanumeric characters and may be a string of text that uniquely identifies the storage server to one or more users.

While FIG. 3 shows a specific configuration of a logical volume layout, other configurations may be used without departing from the scope of the invention. Accordingly, embodiments disclosed herein should not be limited to the configuration of devices and/or components shown in FIG. 3.

Figure 4A:
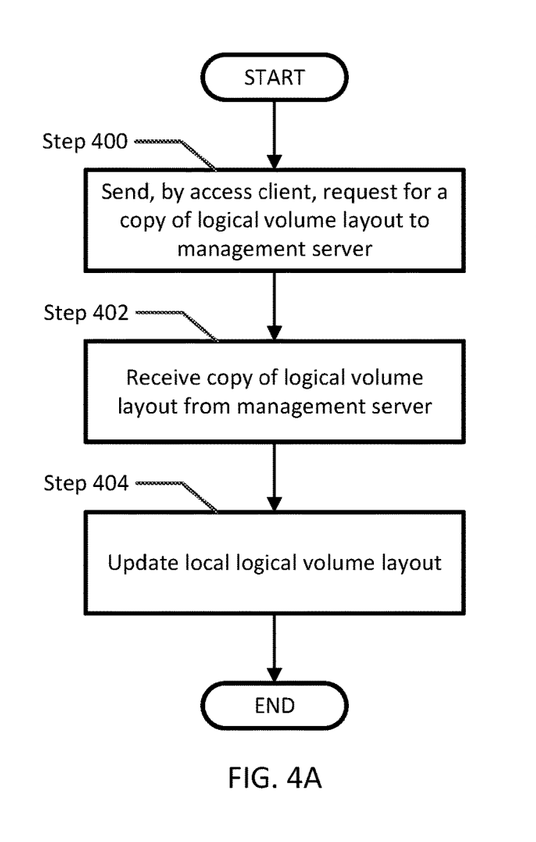
FIG. 4A shows a flowchart of a method of interacting with a management server, in accordance with one or more embodiments of the invention.

FIG. 4A shows a flowchart of a method of interacting with a management server, in accordance with one or more embodiments of the invention. All or a portion of the method shown in FIG. 4A may be performed by one or more components of the access client. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, an access client sends a request for a copy of the logical volume layout to a management server. In one or more embodiments of the invention, an access client may periodically request a copy of the logical volume layout from a management server to receive the most up-to-date version of the logical volume layout including any changes made to one or more logical volumes (since the most recently stored version). Alternatively, in one embodiment of the invention, in an instance where the access client is first initializing and does not have a copy of the logical volume layout, the access client may make an initial request to receive the logical volume layout from the management server.

In Step 402, the access client receives a copy of the logical volume layout from the management server. In one embodiment of the invention, in response to receiving the request for a copy of logical volume layout, the management server transmits a copy of the latest version of the logical volume layout to the requesting access client. In one embodiment of the invention, a copy of the logical volume layout is transmitted by the management server and received by the access client via an operative connection between the two nodes hosting the management server and access client (e.g., via their communication interfaces), respectively. Alternatively, in the event that the management server and access client are hosted on the same node, the copy of the logical volume layout may be transmitted internally within that single node.

Additionally, or alternatively, in one or more embodiments of the invention, the management server may send an updated copy of the logical volume layout to the access client (even without the access client first requesting a copy, Step 400). For example, a management server may be configured to identify a change in the logical volume layout due to some underlying change to one or more storage nodes and, in response to identifying that change, the management server may initiate transmission of the logical volume layout to the access client. Thus, instead of waiting for each access client to request the latest copy of the logical volume layout, the management server may force an update when a modification to the logical volume layout occurs.

In Step 404, the access client updates (e.g., overwrites) any existing copy of the logical volume layout with the new copy of the logical volume layout received in Step 402. Further, in one embodiment of the invention, where the access client does not already maintain a copy of the logical volume layout, the access client stores the copy of the logical volume layout (received in Step 402) in the storage (and/or memory thereof). Further, in one or more embodiments of the invention, an access client may generate (or otherwise update) one or more object(s) for each logical volume specified in the logical volume layout.

Figure 4B:
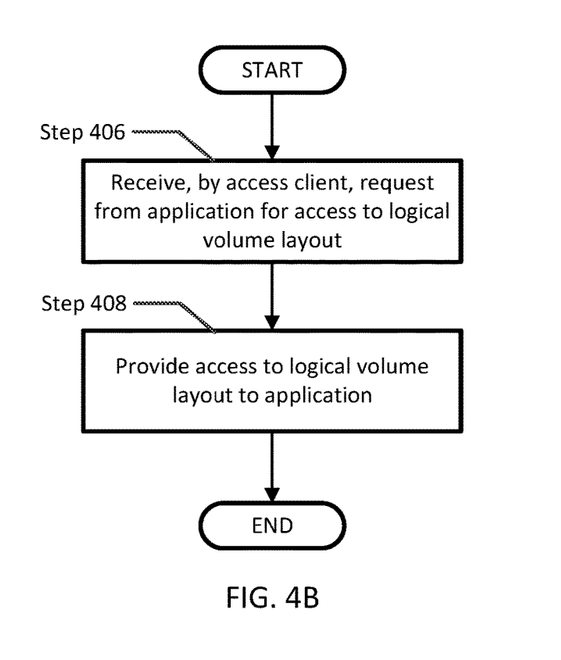
FIG. 4B shows a flowchart of a method of interacting with an application, in accordance with one or more embodiments of the invention.

FIG. 4B shows a flowchart of a method of interacting with an application, in accordance with one or more embodiments of the invention. All or a portion of the method shown in FIG. 4B may be performed by one or more components of the access client. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 406, an access client receives a request, from an application, for access to the logical volume layout. In one embodiment of the invention, the request to provide access to the logical volume layout may be a smaller process of a larger task (e.g., mounting a file system, accessing a particular file, etc.). Further, in one embodiment of the invention, the request from the application may be for one or more components of the logical volume layout (e.g., only a list of volume identifiers, sizes, associated storage servers, etc.).

In Step 408, the access client provides access to the logical volume layout (or requested portion thereof) to the application. In one embodiment of the invention, the access client may copy the logical volume layout (or requested portion thereof) to memory and provide that copy to the requesting application.

Alternatively, in one or more embodiments of the invention, the application may be able to directly access the logical volume layout without utilizing any process of the access client (e.g., if the logical volume layout is shared as an object). For example, after the access client obtains a copy of the logical volume layout and maintains the corresponding data in memory, the application may directly access the data that includes the logical volume layout without causing the access client to perform any operation. Accordingly, in one embodiment of the invention, the access client may generally provide (and update) the logical volume layout to any user space software (e.g., directly or via the generation of objects).

Figure 5:
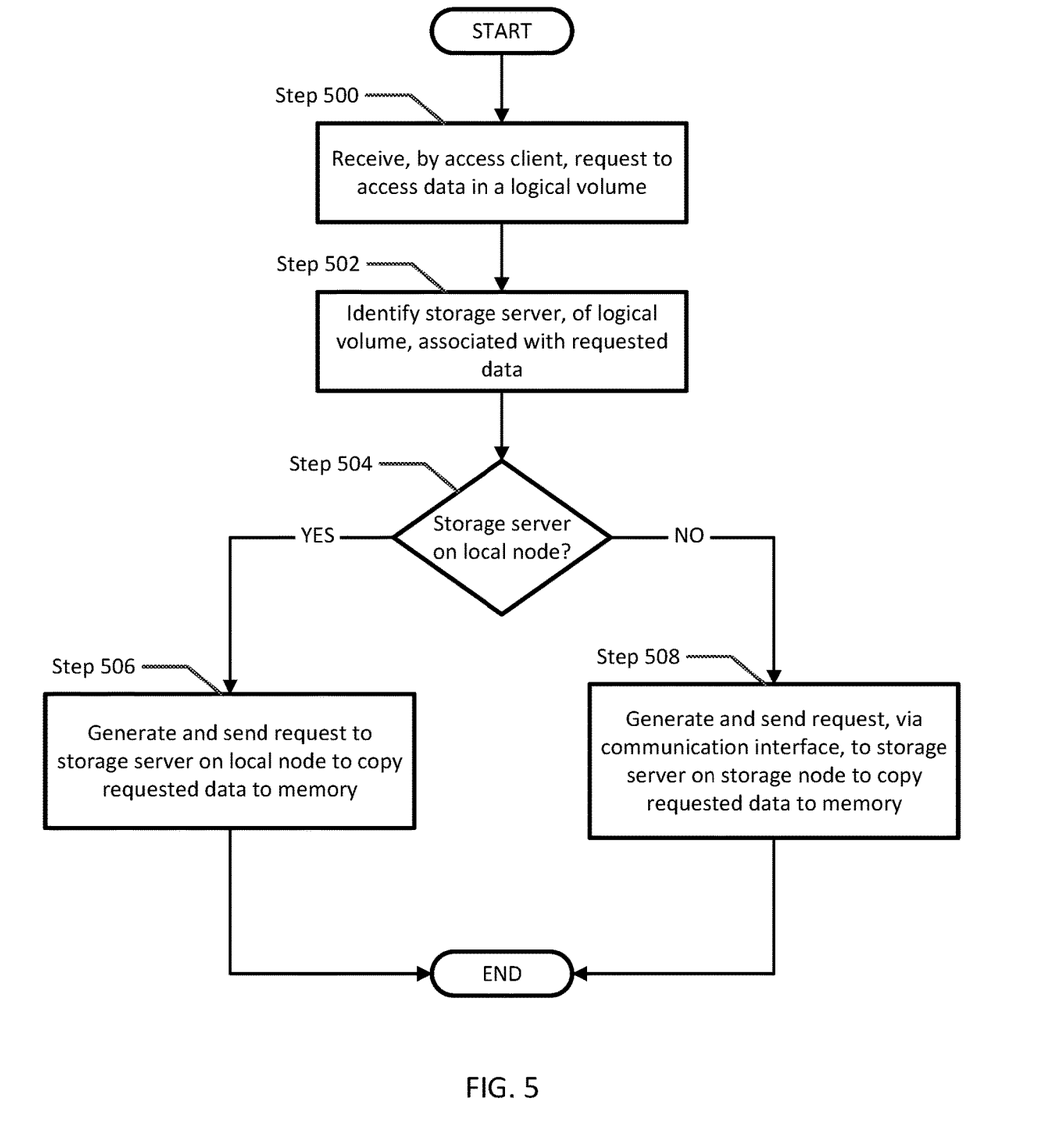
FIG. 5 shows a flowchart of a method of accessing data, in accordance with one or more embodiments of the invention.

FIG. 5 shows a flowchart of a method of accessing data, in accordance with one or more embodiments of the invention. All or a portion of the method shown in FIG. 5 may be performed by one or more components of the client node. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, an access client receives a request to access data in a logical volume. A request to access data may be a read request, a request to overwrite existing data, or a request to write new data. In one or more embodiments of the invention, a request to access data may specify (i) the logical volume that includes the data (or will include the new data), (ii) an offset within that logical volume, (iii) a length of the data range, (iv) a file system identifier (e.g., an alphanumeric string and/or numerical value associated with a file system that manages the data), and/or (v) a data identifier (e.g., an alphanumeric string and/or numerical value uniquely associated with a file or file segment). In one embodiment of the invention, where the request to access data does not specify the logical volume that includes the data, but does specify a file system identifier and/or data identifier, the access client may configured to identify the logical volume based on the file system identifier and/or data identifier.

In one or more embodiments of the invention, an offset (e.g., "logical volume offset") is a numerical value that indicates the location of some data within a logical volume. In one embodiment of the invention, the numerical value of the offset corresponds to "blocks" (i.e., fixed size units of data) that include the logical volume. Alternatively, the offset may refer to the specific location (e.g., "logical volume address") of data within a logical volume (i.e., equivalent to an offset counting from location 0).

In one embodiment of the invention, the application is configured to send data access requests to the access client directly (e.g., in user space). Alternatively, in one embodiment of the invention, the application may (initially) send the request to access data to the operating system which, in turn, is configured to redirect the request to the access client executing in user space.

In Step 502, the access client identifies the storage server associated with the requested data. In one or more embodiments of the invention, an access client identifies a storage server associated with the requested data by performing a lookup in the logical volume layout (previously received from a management server) to identify the logical volume associated with the requested data. Specifically, the access client may be configured to identify a logical volume, of the logical volume layout, by analyzing one or more properties of the request to access data, including, a specified file system, a data identifier, a specified logical volume, and/or any other type of information that may directly or indirectly associated the requested data with a particular logical volume.

In one embodiment of the invention, a logical volume may be associated with multiple storage servers (and therefore multiple storage devices). Accordingly, it may be necessary to determine which particular storage server, of the logical volume, is managing the requested data. Accordingly, in one or more embodiments of the invention, once the logical volume associated with the requested data is identified, the access client performs a lookup in the logical volume to determine which block group includes the specified offset. For example, if the logical volume includes two block groups—Block Group A with blocks 1024-2047 and Block Group B with block 2048-3071—and the offset specifies block 1443, the access client identifies Block Group A as the block group associated with the requested data (the range 1024-2047 includes the offset 1443).

Continuing with the example, each block group in the logical volume is associated with a storage server identifier (e.g., Storage Server Identifier A and Storage Server Identifier B, respectively), thus by identifying the block group, the access client determines the associated storage server (via the storage server identifier) that manages the requested data (e.g., Storage Server A).

In Step 504, the access client makes a determination as to whether the storage server is executing on the same node on which the access client is executing (i.e., "local node", "client node"), or whether the storage server is executing on a separate node that is operatively connected to the local node. In one or more embodiments of the invention, the determination as to whether the storage server is local is based on the storage server (and the address thereof) identified in Step 502.

For example, if the address associated with the storage server is the same address as the node on which the access client is executing, the access client is configured to positively determine that the identified storage server is local. Alternatively, if the address associated with the storage server identified in Step 502 is not the same address of the node on which the access client is executing, then the access client is configured to identify that the storage server is executing on a remote node (e.g., "storage node"), thereby requiring the use of a communication interface to access the requested data. If the storage server is determined to be local (504—YES), the process proceeds to Step 506. Alternatively, if the storage server is determined to be remote (504—NO), the process proceeds to Step 508.

In Step 506, the access client generates and sends a command to the storage server in the operating system of the local node to copy the requested data to the memory of the local node (or write new data to a specified location). In one or more embodiments of the invention, the command generated by the access client may specify all of some of the information initially specified in the request received by the access client in Step 500 (the logical volume that includes the data, an offset within that logical volume, a length of the data range, and/or a data identifier).

In one or more embodiments of the invention, as the access client determines the logical volume, offset, and storage server for the requested data, operating system software (that conventionally performs those functions) does not need to be executed and virtual operating system devices (that conventionally provide this data) are not utilized (e.g., kernel "block devices").

In one or more embodiments of the invention, as the storage server is executing on the same node as the access client, the command generated by the access client is forwarded directly to the storage server in the operating system (i.e., without an IP address).

In Step 508, the access client generates and sends a command to the storage server of the remote node to copy the requested data to the memory of the local node (or write new data to a specified location). In one or more embodiments of the invention, the command generated by the access client may specify all of some of the information initially specified in the request received by the access client in Step 500 (the logical volume that includes the data, an offset within that logical volume, a length of the data range, and/or a data identifier).

In one or more embodiments of the invention, as the access client determines the logical volume, offset, and storage server for the requested data, operating system software (that conventionally performs those functions) does not need to be executed and virtual operating system devices (that conventionally provide this data) are not utilized (e.g., kernel "block devices").

In one or more embodiments of the invention, as the storage server is executing on a different node than the access client, the command generated by the access client further specifies the address (e.g., IP address) of the remote node on which the storage server is executing (i.e., "storage node"). Accordingly, in one embodiment of the invention, the command may include the data identifier, the offset, an identification of the logical volume, and specify, as the recipient, the storage node hosting the storage server by using, for example, the IP address of that storage node.

In one or more embodiments of the invention, the access client sends the command to the hardware layer of the local node, where, in turn, one or more components of the local hardware layer send the command to the storage node via a communication interface of the local node (i.e., "client node") and a communication interface of the storage node, respectively.

After Step 506 or Step 508, the storage server (having received the command generated by the access client) initiates copying the requested data to the memory of the node hosting the access client (i.e., "local node", "client node"). Alternatively, if the command specified the creation of new data, the storage server initiates writing that new data to the specified region of storage of the storage node.

Figure 6:
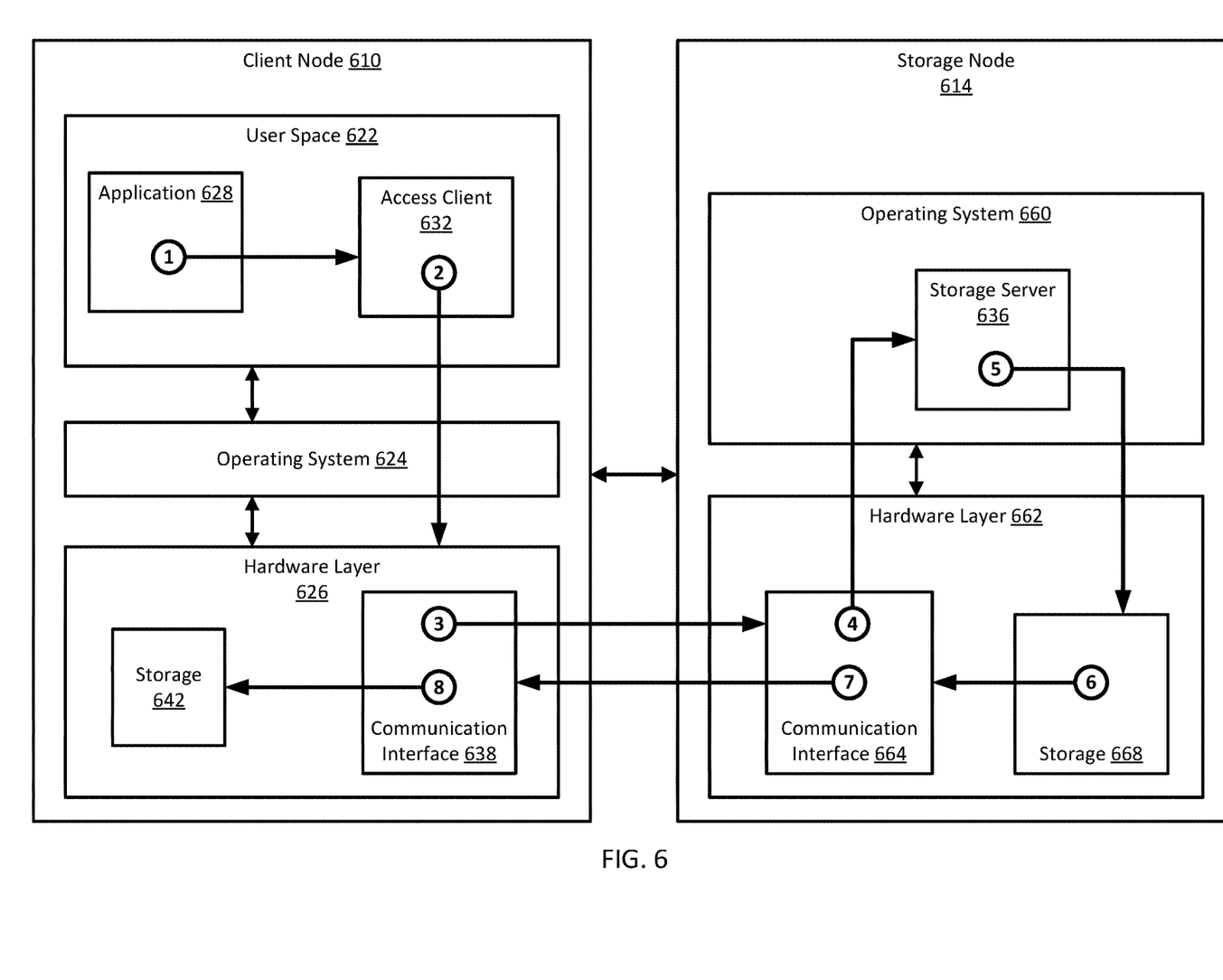
FIG. 6 shows an example, in accordance with one or more embodiments of the invention.

FIG. 6 shows an example in accordance with one or more embodiments of the invention. The following use case is for explanatory purposes only and not intended to limit the scope to this embodiment.

In FIG. 6, consider a scenario in which, client node (610) includes user space (622), application (628), access client (632), operating system (624), hardware layer (626), storage (642), and communication interface (638); and, storage node (614) includes operating system (660), storage server (636), hardware layer (662), communication interface (664), and storage (668). Further, at some point in time prior to (1), the access client (632) obtains a logical volume layout from a management server (not shown, which may be executing on the client node (610), the storage node (614) or another node (not shown)). The logical volume layout is obtained in accordance with FIGS. 4A-4B.

At (1), application (628) issues a read request for a file specifying a data identifier and an offset. The application (628) then forwards the request to the access client (632) to retrieve the requested data.

At (2), the access client (632) receives the request to read data and, using the logical volume layout, determines the logical volume that hosts the data indicated by the data identifier. Once the logical volume is identified, the access client (632) identifies the block group (in that logical volume) that includes the range of blocks that includes the block specified by the offset. Once the block group is identified, the access client (632) identifies the storage server identifier (e.g., IP address, name) associated with that block group.

The access client (632) then determines that the IP address of the node hosting the storage server (636) is a remote node (i.e., storage node (614), not the node on which the access client (632) is executing). Accordingly, the access client (632) generates and sends a command (specifying the storage node (614) as the recipient) to copy and send the requested data to the storage (642) (or specifically the memory thereof) of the client node (610). The command is sent directly to the hardware layer (626) with minimal, if any, interaction from operating system (624) software that (conventionally) manages logical and/or physical storage volumes (e.g., bypassing the use of kernel "block devices").

At (3), the communication interface (638) (of the client node (610)) sends the command to the communication interface (664) (of the storage node (614)) via an operative connection between the two nodes (610, 614). The communication interface (638) (of the client node (610)) transmits the command via a network using the IP address of the storage node (614).

At (4), the communication interface (664) (of the storage node (614)) receives the command and forwards the command to the storage server executing in the operating system (660) (of the storage node (614)). At (5), the storage server (636) generates a command to copy the data to the storage (642) (of the client node (610)) and uses the offset specified in the received command to locate the requested data in the storage (668) (of the storage node (614)). The newly generated command is then sent to the hardware layer (662) (of the storage node (614)) for processing.

At (6), the data is copied and transmitted to the communication interface (664) (of the storage node (614)). At (7), the communication interface (664) (of the storage node (614)) sends the copy of the requested data to the communication interface (638) (of the client node (610)). At (8), the communication interface (638) (of the client node (610)) sends the data to be written to the storage (642) (of the client node (610)) thereby providing access to the application (628).

One or more embodiments of the invention make it possible for to execute and utilize user space software for the access (e.g., read, write, create, etc.) of data on storage devices thereby bypassing core operating system software (e.g., kernel software). Accordingly, in one embodiment of the invention, software executes in user space that allows for the abstraction of logical storage volumes into objects, which are then made accessible to other application(s) and/or file systems executing in user space. Thus, by performing storage abstraction functions in user space, existing kernel software that performs duplicative functions may be bypassed.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for accessing data, comprising:
receiving, by an access client executing in user space, a request to read data, wherein the request to read data comprises a file system identifier and an offset;
identifying, by the access client, a storage server associated with the data, wherein identifying the storage server comprises:
performing a lookup, in a logical volume layout in the user space, to identify a logical volume associated with the file system identifier;
identifying a block group, in the logical volume, that matches the offset; and
identifying the storage server associated with the block group;
generating, by the access client a command to copy the data to memory;
sending the command directly from the access client to the storage server, and
wherein the logical volume layout comprises a data structure comprising a listing of one or more logical volumes, wherein each listing specifies a volume identifier, one or more block groups, and one or more associated storage server identifiers.

2. The method of claim 1, wherein the logical volume is an object generated by the access client.

3. The method of claim 1, wherein the access client is executing on a first node, wherein the first node comprises the memory.

4. The method of claim 3, wherein the storage server is executing on a second node operatively connected to the first node, and wherein the second node comprises storage, wherein the storage comprises the data.

5. The method of claim 4, wherein the command to copy the data comprises:
an address of the second node;
an address of the first node; and
the offset.

6. A non-transitory computer readable medium comprising instructions which, when executed by a computer processor, enables the computer processor to perform a method for accessing data, the method comprising:
receiving, by an access client executing in user space, a request to read data, wherein the request to read data comprises a file system identifier and an offset;
identifying, by the access client, a storage server associated with the data, wherein identifying the storage server comprises:
performing a lookup, in a logical volume layout in the user space, to identify a logical volume associated with the file system identifier;
identifying a block group, in the logical volume, that matches the offset; and
identifying the storage server associated with the block group;
generating, by the access client, a command to copy the data to memory;
sending the command directly from the access client to the storage server, and
wherein the logical volume layout comprises a data structure comprising a listing of one or more logical volumes, wherein each listing specifies a volume identifier, one or more block groups, and one or more associated storage server identifiers.

7. The non-transitory computer readable medium of claim 6, wherein the logical volume is an object generated by the access client.

8. The non-transitory computer readable medium of claim 6, wherein the access client is executing on a first node, wherein the first node comprises the memory.

9. The non-transitory computer readable medium of claim 8, wherein the storage server is executing on a second node operatively connected to the first node, and wherein the second node comprises storage, wherein the storage comprises the data.

10. The non-transitory computer readable medium of claim 9, wherein the command to copy the data comprises:
an address of the second node;
an address of the first node; and
the offset.

11. A node, comprising:
memory; and
a processor, wherein the processor is configured to perform a method, comprising:
receiving, by an access client executing in user space, a request to read data, wherein the request to read data comprises a file system identifier and an offset;
identifying, by the access client, a storage server associated with the data, wherein identifying the storage server comprises:
performing a lookup, in a logical volume layout in the user space, to identify a logical volume associated with the file system identifier;
identifying a block group, in the logical volume, that matches the offset; and
identifying the storage server associated with the block group;
generating, by the access client, a command to copy the data to the memory;
sending the command directly from the access client to the storage server, and
wherein the logical volume layout comprises a data structure comprising a listing of one or more logical volumes, wherein each listing specifies a volume identifier, one or more block groups, and one or more associated storage server identifiers.

12. The node of claim 11, wherein the logical volume is an object generated by the access client.

13. The node of claim 11, wherein storage server is executing on a second node operatively connected to the first node, and wherein the second node comprises storage, wherein the storage comprises the data.

14. The node of claim 13, wherein the command to copy the data comprises:
an address of the second node;
an address of the node; and
the offset.

* * * * *